(12) United States Patent
Okai et al.

(10) Patent No.: US 6,361,029 B1
(45) Date of Patent: Mar. 26, 2002

(54) VIBRATION DAMPER

(75) Inventors: Shigeki Okai, Kanagawa; Kazutaka Ohtsu, Tokyo, both of (JP)

(73) Assignees: Nissan Motor Co., Ltd., Kanagawa; Bridgestone Corporation, Tokyo, both of (JP)

( * ) Notice: Subject to any disclaimer, the term of this patent is extended or adjusted under 35 U.S.C. 154(b) by 0 days.

(21) Appl. No.: 09/703,177

(22) Filed: Oct. 31, 2000

(30) Foreign Application Priority Data

Nov. 2, 1999 (JP) .......................................... 11-313132

(51) Int. Cl.$^7$ ............................. F16M 5/00; F16F 5/00
(52) U.S. Cl. .................................................. 267/140.12
(58) Field of Search ........................... 267/140.12, 293, 267/219; 180/300, 312

(56) References Cited

U.S. PATENT DOCUMENTS 4,768,760 A * 9/1988 Le Fol .................. 267/140.13
4,861,005 A   8/1989 Bausch
4,893,798 A * 1/1990 Hibi et al. ............. 267/140.13
5,145,155 A * 9/1992 Funahashi et al. ...... 267/140.12
5,213,313 A * 5/1993 Tsutsumida et al. .... 267/140.12
5,820,115 A * 10/1998 Stevenson et al. ......... 267/293

FOREIGN PATENT DOCUMENTS

| DE | 4033569 | 10/1991 |
| EP | 0430796 | 6/1991 |
| FR | 2650040 | 1/1991 |

* cited by examiner

*Primary Examiner*—Christopher P. Schwartz
(74) *Attorney, Agent, or Firm*—Jordan and Hamburg LLP

(57) ABSTRACT

A vibration damper includes an outer cylinder, an overhung pin which is put inside the outer cylinder, and an elastic rubber body in direct contact with the overhung pin; the outer cylinder, the overhung pin and the elastic rubber body being combined with each other with an adhesion strength the elastic rubber body will have when it is vulcanized.

10 Claims, 9 Drawing Sheets

F I G. 5
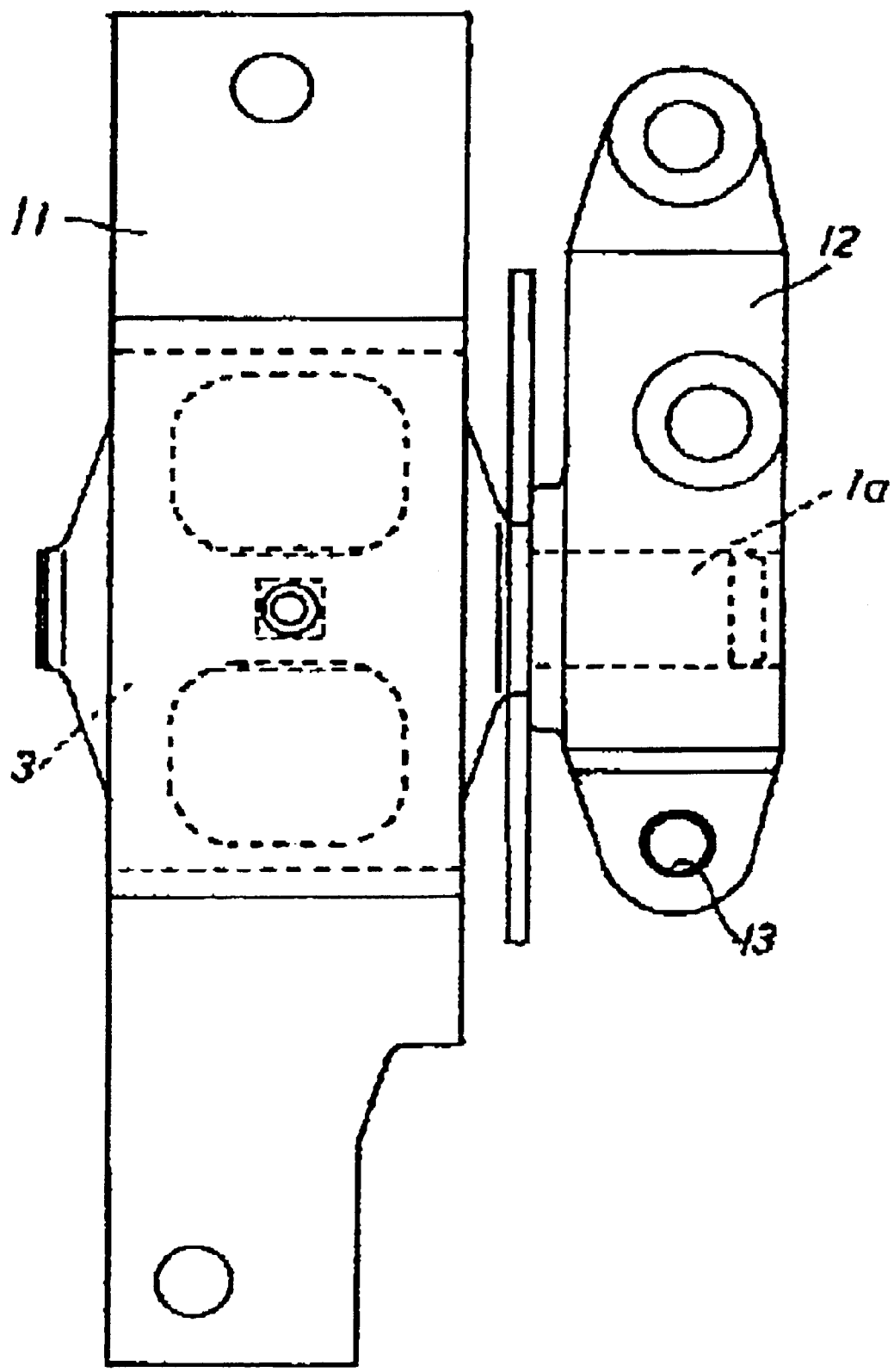

VIBRATION DAMPER

BACKGROUND OF THE INVENTION

1. Field of the Invention

The present invention relates to a vibration damper for use in vehicles, and more particularly to a vibration damper supported on an overhung pin.

2. Description of the Related Art

Recently, more and more vehicles are designed to be smaller in weight, height and engine room space. To catch up with this tendency, the vibration dampers used mainly as the engine mount also show a tendency to be smaller since they are to be installed in such narrower engine rooms. Especially, with the tendency of the engine room space to be narrower, overhung type engine mounts are adopted in more and more vehicles. On the other hand, in the automobile industries, an easier installation of the engine mount between the car body and engine has been considered for an improved productivity. The overhung type engine mounts have so far been proved to be easiest to install. To support a heavy engine, a large overhung pin should be used.

FIG. 1 is a cross section of a conventional overhung type engine mounts, and FIG. 2 is a sectional view, taken along the line B—B in FIG. 1, of the engine mount. As shown, the conventional overhung type engine mount typically includes inner and outer cylinders 21 and 22, an elastic rubber body 23 formed from an unvulcanized rubber filled between the inner and outer cylinders 21 and 22 and then vulcanized to combine the cylinders with each other, and a pin 24 forced-fitted in the inner cylinder 21. Since the pin 24 has to support the weight of the heavy engine, it has to be large in diameter. The diameter of the inner cylinder 21 in which the pin 24 is force-fitted should be large accordingly.

While the engine mount should preferably have a smaller structure for the above reason, its inner cylinder 21 has to be large in diameter. To meet the former requirement, the elastic rubber body 23 existent between the inner and outer cylinders 21 and 22 has to be smaller in volume and the arm length of the rubber will also be reduced, which has a possibility to reduce a durability of the engine mount. The increased diameter of the inner cylinder 21 is opposite to the requirement for the smaller weight and small size of parts. If the engine mount is designed to be smaller, the arm length of the elastic rubber body 23 has to be reduced correspondingly. Therefore the engine mount is desirable to be designed to be smaller without lower durability.

OBJECT AND SUMMARY OF THE INVENTION

The present invention has an object to overcome the above-mentioned drawbacks of the prior art by providing an overhung type vibration damper having a new structure.

The above object can be attained by providing a vibration damper including according to the present invention, an outer cylinder, an overhung pin which is put inside the outer cylinder, and an elastic rubber body put between the outer cylinder and overhung pin; the outer cylinder, the overhung pin and the elastic rubber body being combined with each other with an adhesion strength the elastic rubber body will have when it is vulcanized.

In the vibration damper according to the present invention, the outer cylinder forming the shell of the vibration damper and the overhung pin supporting an engine are combined directly with each other by vulcanizing a vibration damping rubber put between the outer cylinder and overhung pin. Thus, the inner cylinder is the conventional vibration damper is omitted in the vibration damper according to the present invention in which thus the free length of the elastic rubber body can be assured even with an increased diameter of the overhung pin. Also, since the inner cylinder is thus omitted, the vibration damper can be smaller in weight and in addition the manufacturing cost of the product can be reduced since the process of force-fitting the pin into the inner cylinder is not required.

The elastic rubber body referred to herein may be an ordinary rubber. To provide a damping effect of the fluid, the elastic rubber body may be a one in which a fluid is sealed.

Note that the present invention is advantageous in that the overhung pin may be a tandem pin which is formed with different diameters. The pin could not be used in the conventional product since the pin has to be force-fitted into the inner cylinder. Namely, the omission of the inner cylinder has thus contributed to the improvement of the vibration damper according to the present invention.

More specifically, the larger diameter at a central portion of the pin in contact with the elastic rubber body than the diameter at opposite ends of the pin, permits to prevent the pin from going out of the elastic rubber body. Further, the waving of a central portion of the pin contributes to increase the area of contact with the elastic rubber body, thus increasing the adhesion strength to the elastic rubber body.

These objects and other objects, features, and advantages of the present invention will become more apparent from the following detailed description of the preferred embodiments of the present invention when taken in conjunction with the accompanying drawings. It should be noted that the present invention is not limited to the embodiments but can freely be modified without departing from the scope and spirit thereof defined in the claims given later.

BRIEF DESCRIPTION OF THE DRAWINGS

FIG. 5 is a plan view of the overhung type vibration damper according to the present invention, used as an engine mount;

DETAILED DESCRIPTION OF THE PREFERRED EMBODIMENTS

Figure 1:
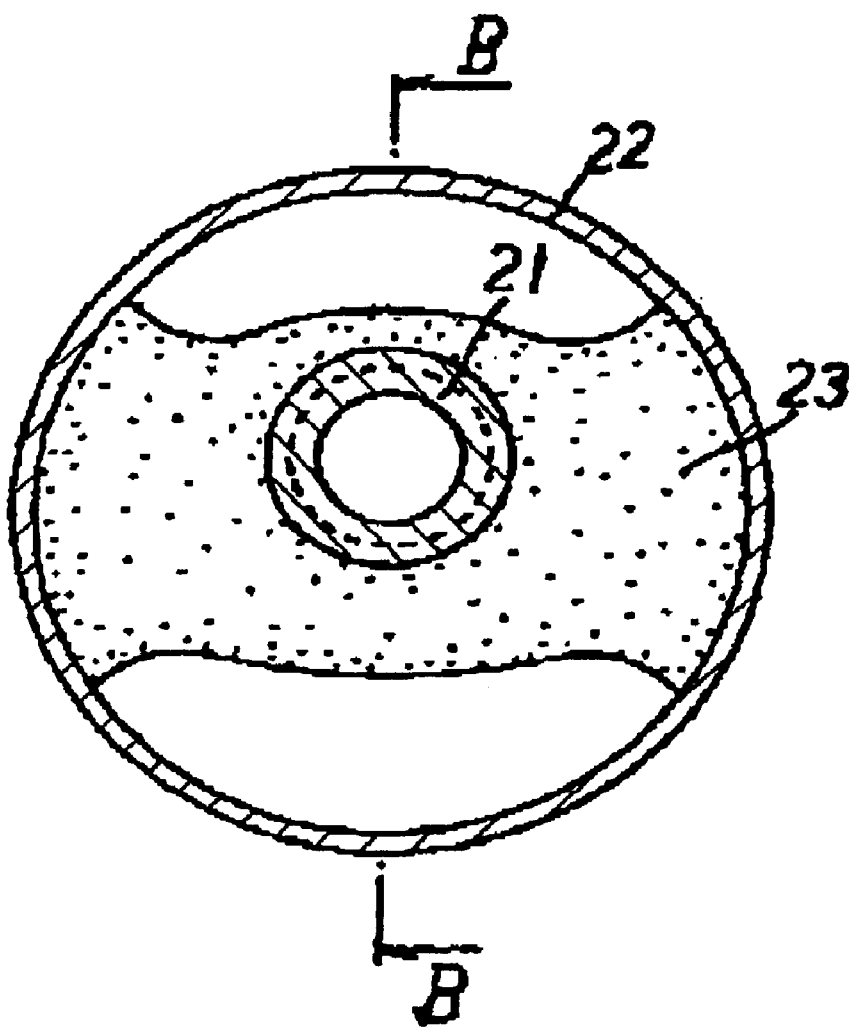
FIG. 1 is a cross section of a conventional vibration damper.
Figure 2:
FIG. 2 is a sectional view, taken along the line B—B in FIG. 1, of the conventional vibration damper.
Figure 2:
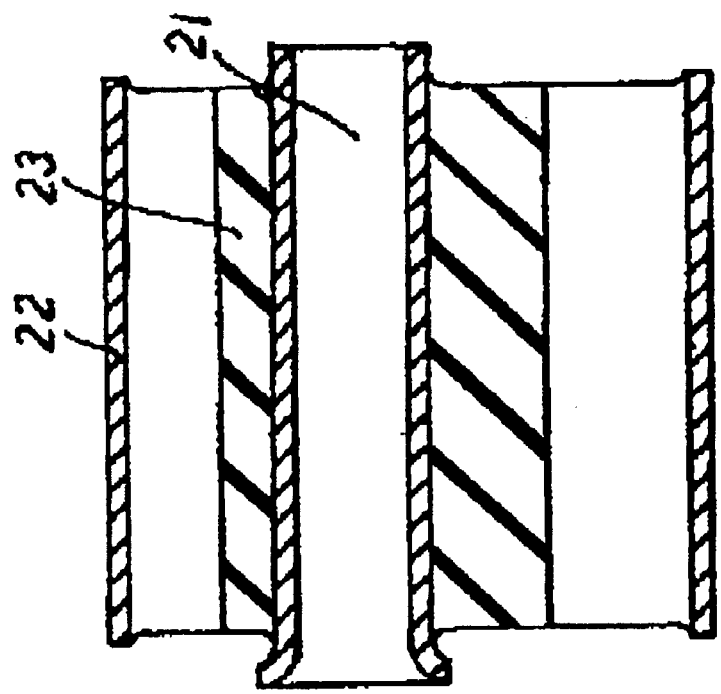
Figure 3:
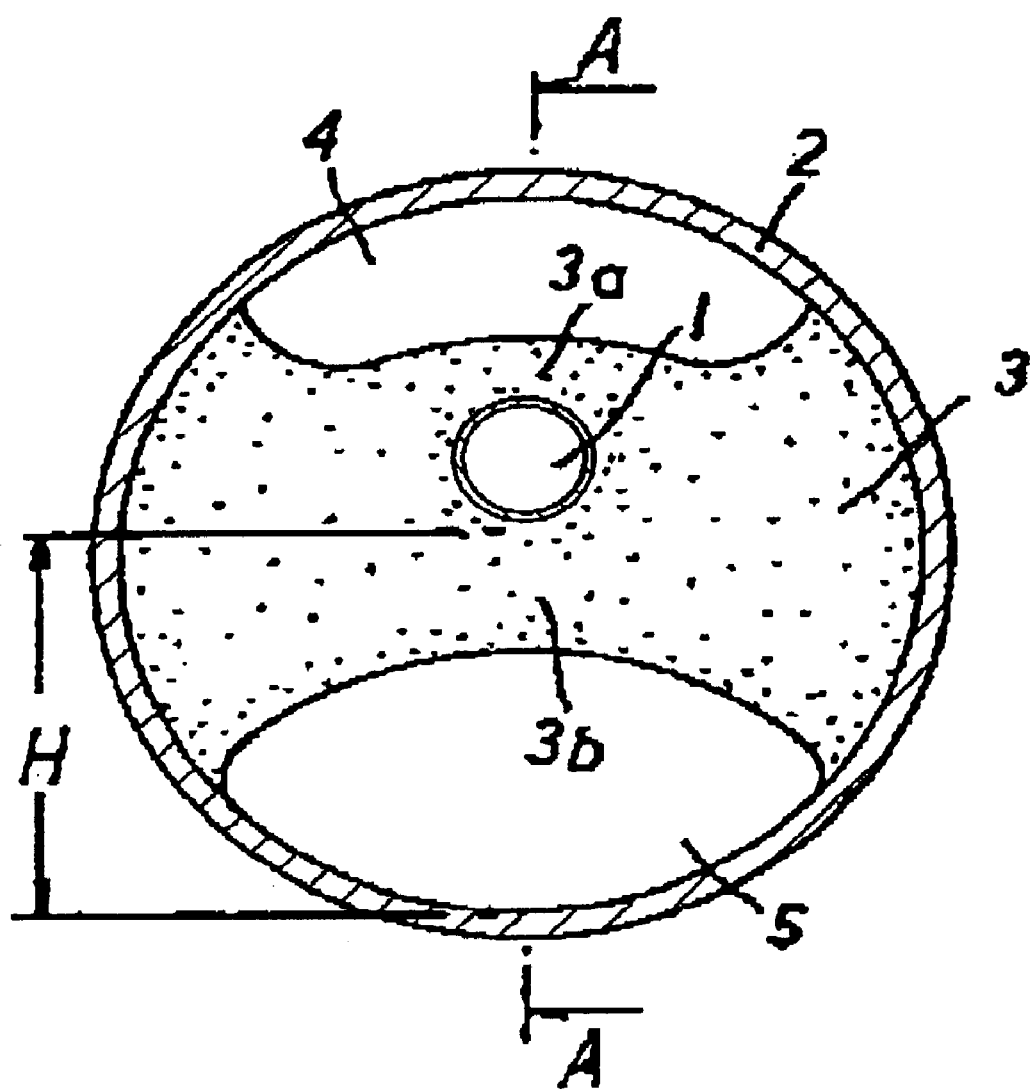
FIG. 3 is a cross section of an embodiment of the vibration damper according to the present invention.
Figure 4:
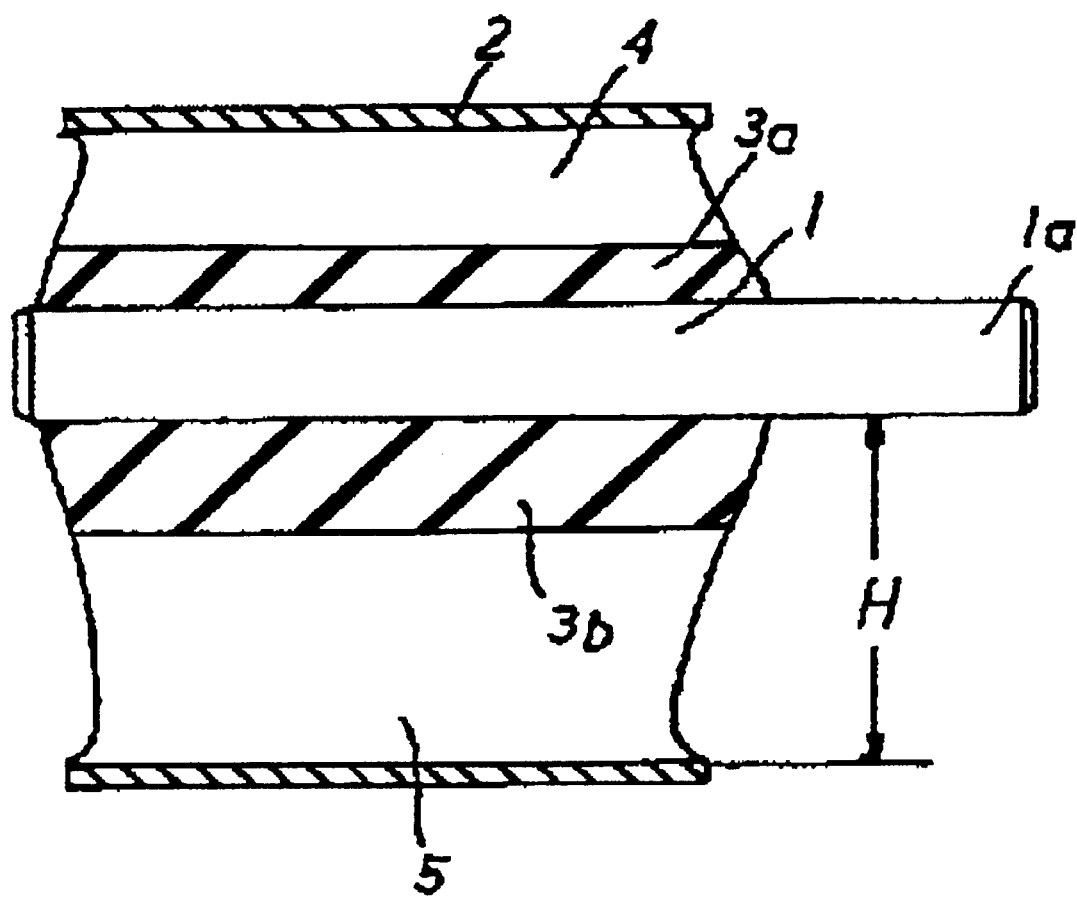
FIG. 4 is a sectional view, taken along the line A—A in FIG. 3, of the vibration damper according to the present invention.

Referring now to FIG. 3, there is illustrated in the form of a cross section of the vibration damper according to the present invention, used as an overhung type engine mount. FIG. 4 is a sectional view taken along the line A—A in FIG. 3. As seen, the vibration damper according to the present invention includes no inner cylinder used in the conventional vibration damper, but only a overhung pin 1, an outer cylinder 2 containing the pin 1, and an elastic rubber body 3 formed from an unvulcanized rubber filled between the pin 1 and outer cylinder 2 and then vulcanized to combine the pin 1 and outer cylinder 2 with each other.

The pin 1 has a projection 1a which is to be force-fitted into a bracket at the engine. As shown, the elastic rubber body 3 has axial vacancies 4 and 5 formed at the top and bottom thereof. The outer cylinder 2 is normally cylindrical and it is to be mounted on a bracket at the vehicle. The pin 1 is to be installed horizontally. The axial vacancies 4 and 5 are formed in parallel to the pin 1 in the elastic rubber body 3. Thus, the pin 1 is elastically displaceable up and down for the height of the axial vacancies 4 and 5, respectively. A portion of the elastic rubber body 3, indicated with a reference 3b, under the pin 1 has to be capable of withstand the weight and vibration of the engine. Thus, the portion 3b has a large volume than a portion 3a of the elastic rubber body 1 above the pin 1. That is, free length H is larger on the portion 3b side.

Figure 6:
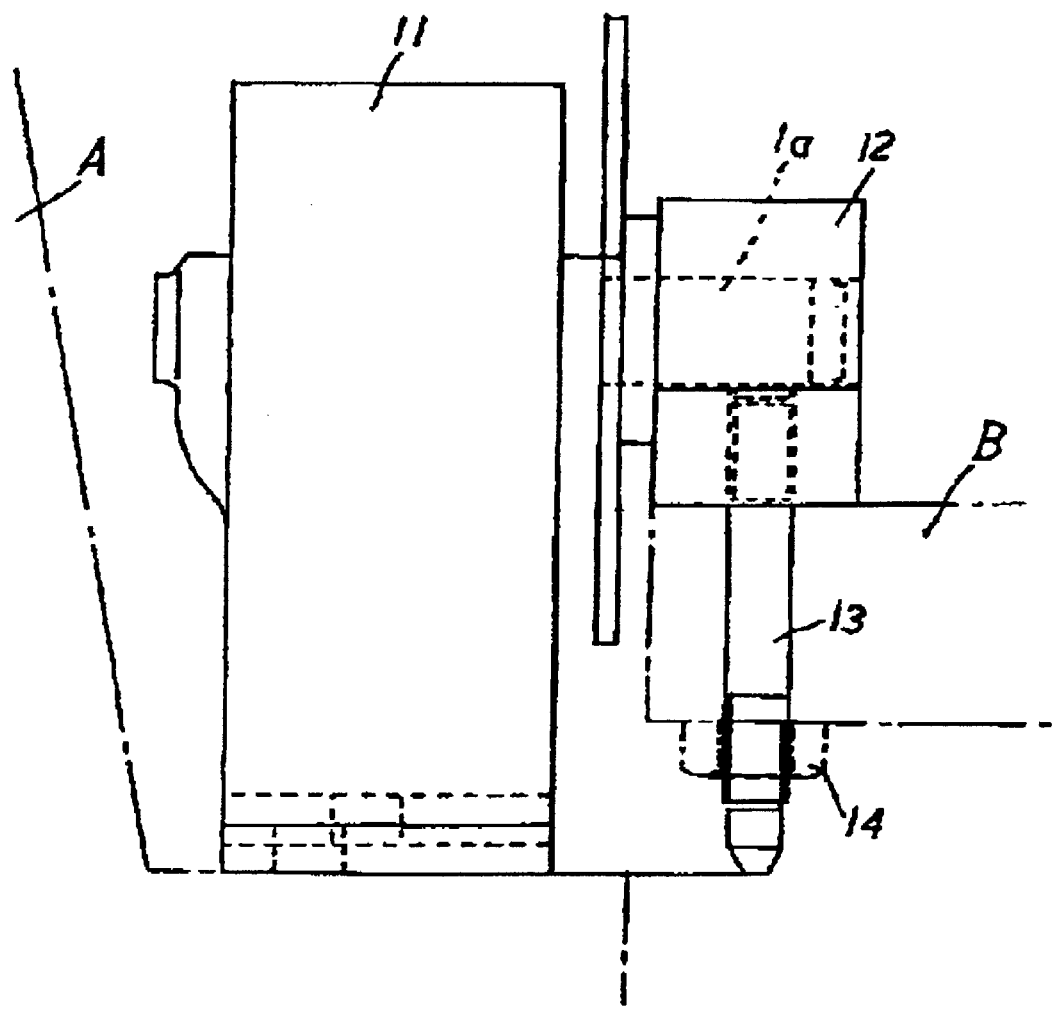
FIG. 6 is a side elevation of the overhung type vibration damper in FIG. 5.
Figure 7:
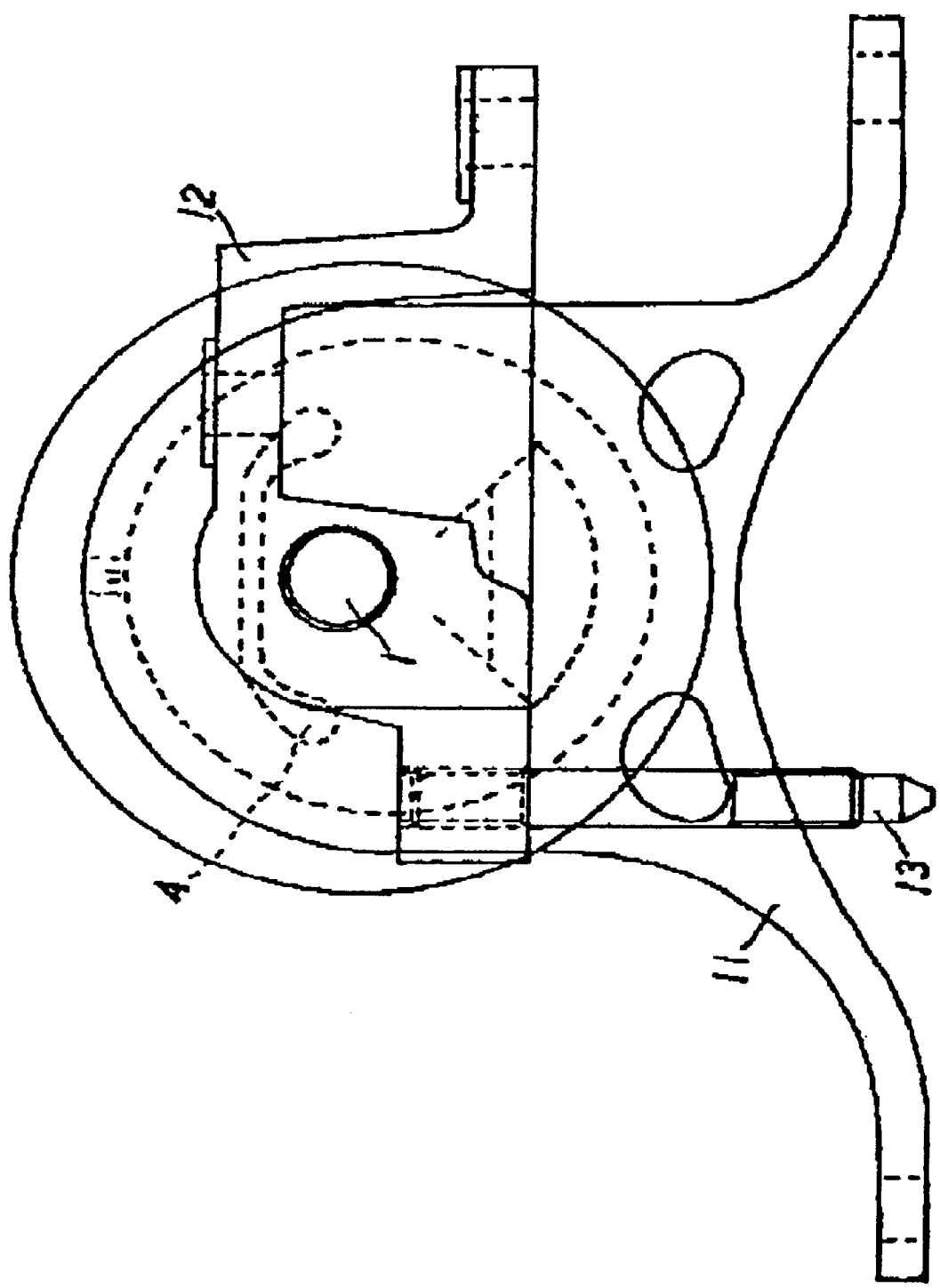
FIG. 7 is a front view of the overhung type vibration damper in FIG. 5.

FIG. 5 is a plan view of the overhung type vibration damper according to the present invention, used as an engine mount, FIG. 6 is a side elevation of the overhung type vibration damper in FIG. 5, and FIG. 7 is a front view of the overhung type vibration damper in FIG. 5. The vehicle using the vibration damper according to the present invention is indicated with a reference A. The vehicle A has a bracket 11 in which the outer cylinder 2 of the vibration damper according to the present invention is to be fitted and fixed with the pin 1 held horizontally. Also a bracket 12 is to be force-fitted onto the projection 1a of the pin 1. A bolt 13 is screwed in the bracket 12 to hoist an engine indicated with a reference B. The bolt 13 is normally directed downward. The vehicle A is to be provided with a plurality of the vibration dampers. For installation of the engine B in the engine room of the vehicle, the engine B is moved gradually from below, the bolt 13 is fitted into a mounting hole in the engine B, and a nut is fitted on to the bolt 13. Thereafter, the engine B is fixed by tightening the nut 14 on the bold 13.

Figure 8:
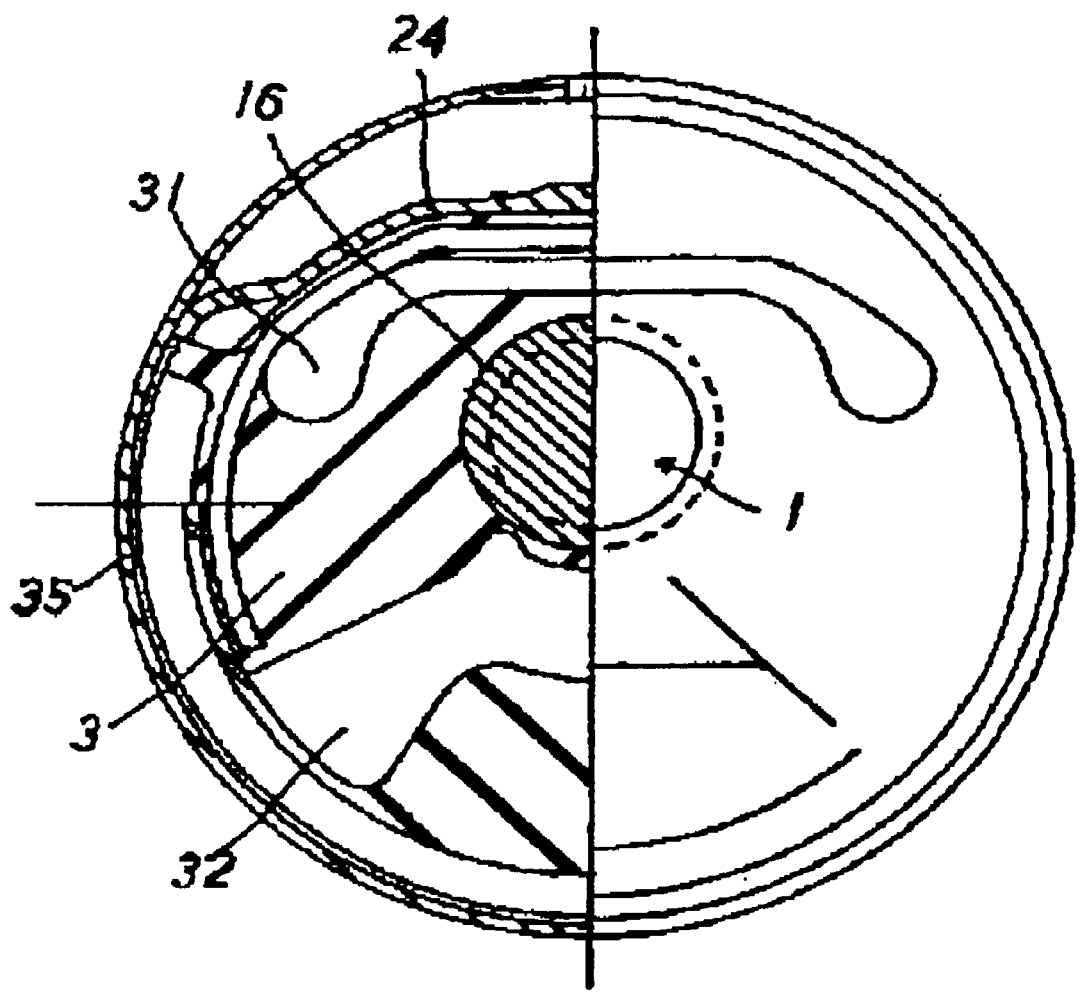
FIG. 8 is a front view, whose half is a cross section, of another embodiment of the vibration damper according to the present invention.
Figure 9:
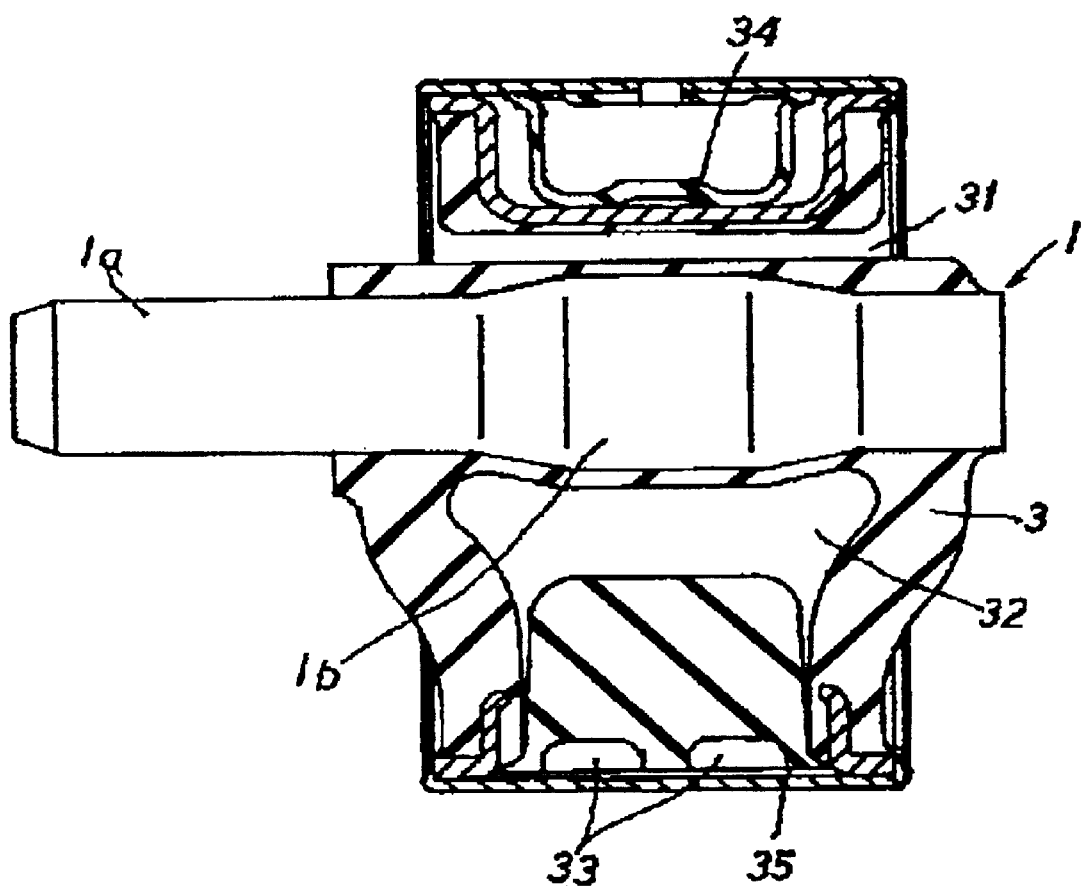
FIG. 9 is a cross section of the vibration damper in FIG. 8.

FIG. 8 is a front view, whose half is a cross section, of another embodiment of the overhung type vibration damper according to the present invention, and FIG. 9 is a cross section of the vibration damper in FIG. 8. This embodiment is a so-called fluid-sealed engine-mount rubber damper. As shown, the pin 1 is enlarged in diameter at a portion thereof in contact with the elastic rubber body 3, as indicated with a reference 1b. The pin 1 is integrated with the elastic rubber body 3 by vulcanizing forming the rubber damper. The pin 1 has also the projection 1a which is to be force-fitted into a bracket (not shown), thus forming the overhung type vibration damper. As shown, the damper has formed therein vacancies 31 and 32, an orifice 33 for passage of the fluid, a rubber membrane 34 and an outer cylinder 35.

As in the above, the larger diameter at a central portion (1b) of the pin 1 in contact with the elastic rubber body 3 than the diameter at opposite ends of the pin 1, permits to prevent the pint 1 from going out of the elastic rubber body 3. Further, the waving (not shown) of a central portion of the pin 1 contributes to increase the area of contact with the elastic rubber body 3, thus increasing the adhesion of the pin 1 to the elastic rubber body 3.

What is claimed is:

1. A vibration damper for an overhung engine mount comprising:

an outer cylinder;

an overhung pin disposed inside the outer cylinder;

the overhung pin having a projection at one end of the overhung pin;

an elastic rubber body disposed between the outer cylinder and the overhung pin, wherein the outer cylinder, the overhung pin and the elastic rubber body are combined with each other with an adhesion strength the elastic rubber body has when it is vulcanized;

the elastic rubber body being in direct contact with the overhung pin;

the overhung pin being completely surrounded by the elastic rubber body except for the projection;

the projection being adapted to be force fitted into a bracket of an engine;

the outer cylinder being adapted to be mounted on a bracket of a vehicle; and at least one vacancy formed between the outer cylinder and the elastic rubber body.

2. The vibration damper according to claim 1, wherein at a portion of the overhung pin in contact with the elastic rubber body, the overhung pin is larger in diameter at a central portion thereof than at opposite ends.

3. The vibration damper according to claim 1, wherein at a portion of the overhung pin in contact with the elastic rubber body, an outer surface of a central portion of the overhung pin is waved.

4. The vibration damper according to claim 3, wherein at a portion of the overhung pin in contact with the elastic rubber body, the overhung pin is larger in diameter at a central portion thereof than at opposite ends.

5. A vibration damper for an overhung engine mount comprising:

a cylinder;

a pin disposed inside the cylinder;

the pin having a projection at one end of the pin;

an elastic body disposed between the cylinder and the pin;

the elastic body being in direct contact with the pin;

the pin being completely surrounded by the elastic body except for the projection;

the projection being adapted to be force fitted into a bracket of an engine;

the cylinder being adapted to be mounted on a bracket of a vehicle; and at least one vacancy formed between the cylinder and the elastic body.

6. The vibration damper according to claim 5, wherein at a portion of the pin in contact with the elastic body, the pin is larger in diameter at a central portion thereof than at opposite ends.

7. The vibration damper according to claim 5, wherein at a portion of the pin in contact with the elastic body, an outer surface of a central portion of the pin is waved.

8. The vibration damper according to claim 7, wherein at a portion of the pin in contact with the elastic body, the pin is larger in diameter at a central portion thereof than at opposite ends.

9. The vibration damper according to claim 5, wherein the cylinder, the pin and the elastic body adhere to each other by curing of the elastic body.

10. The vibration damper according to claim 9, wherein the elastic body is rubber and the curing of the rubber is vulcanization.

* * * * *